Nov. 21, 1933.  F. P. KINSON  1,936,059
SYSTEM FOR PRODUCING AND STORING LIQUID OXYGEN
Filed Jan. 5, 1933
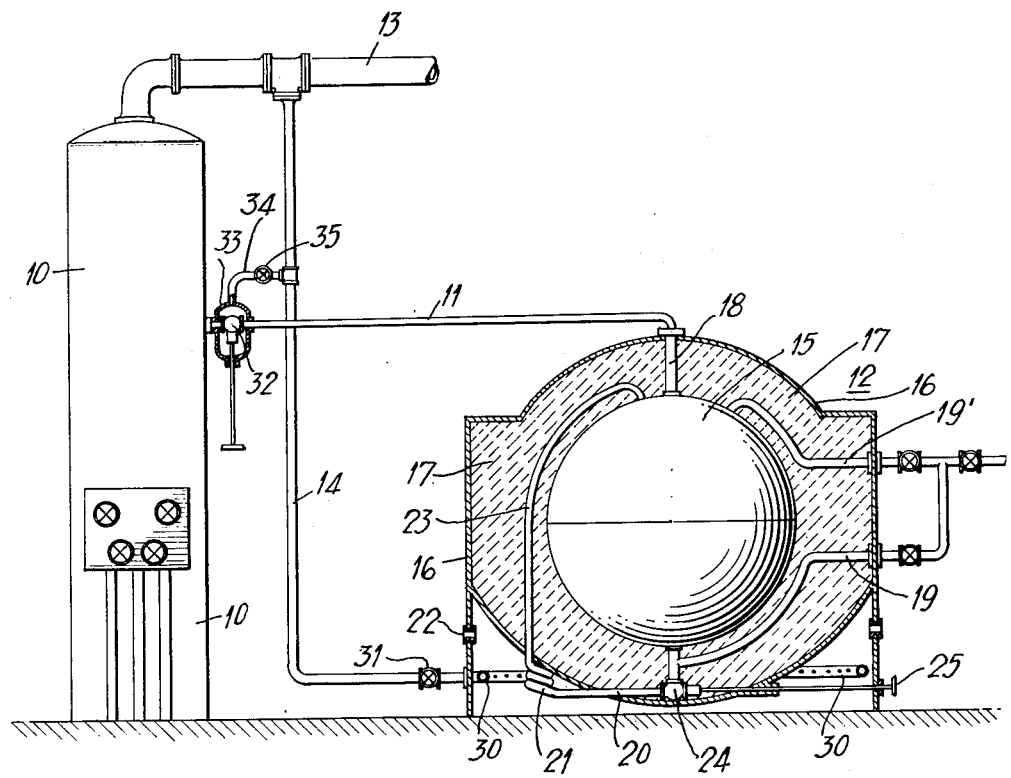
INVENTOR
Frank P. Kinson
BY
Watson, Bristol, Johnson & Leavenworth
ATTORNEYS Patented Nov. 21, 1933

1,936,059

UNITED STATES PATENT OFFICE 1,936,059

SYSTEM FOR PRODUCING AND STORING LIQUID OXYGEN

Frank P. Kinson, Buffalo, N. Y., assignor to The Linde Air Products Company, New York, N. Y., a corporation of Ohio Application January 5, 1933. Serial No. 650,289

6 Claims. (Cl. 62—1)

This invention relates to systems for producing and storing liquid oxygen, especially systems in which liquid oxygen is obtained from the atmosphere by fractionation and rectification, whereby waste products are produced, and to the utilization of such waste products.

The invention has for its object generally an improved construction and arrangement of parts in systems of the character indicated which enable them to be operated in a more efficient and economical manner, and increases their operative life.

More specifically, it is an object of the invention to provide a system of the character indicated with means for utilizing the anhydrous waste products to preserve the operating parts and free them from frost and moisture.

Another object is to provide an improved storage container for the liquid oxygen at production plants which utilize the cold waste nitrogen to provide an atmosphere about operating parts exposed to the atmosphere that may otherwise rust or become coated with frost to an extent which impedes the proper functioning of the system.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

The figure is a view partly in section and partly in elevation showing a system for producing and storing liquid oxygen constructed in accordance with the invention.

Referring now to the drawing, 10 denotes a liquid oxygen production apparatus, for example, a rectifying column for separating the liquid oxygen by fractionation from liquefied gas mixtures, such as the atmosphere, liquid oxygen in a desired state of purity being led off from the apparatus through a conduit 11 to a storage container shown generally at 12. From the top of the rectification column a discharge conduit is shown at 13 through which waste products are vented.

In the system shown, the waste products from the apparatus 10 are anhydrous and comprise mainly nitrogen, all or a portion of which is led away through the conduit 14 to create an atmosphere about a cold operating part of auxiliary apparatus that is exposed to the atmosphere. Such auxiliary apparatus may be any part of the system which cooperates with production apparatus and has an operating part that is likely to accumulate ice and frost when exposed to normal atmosphere. For purpose of illustration, the container 12 is taken as exemplifying the auxiliary apparatus and it has a pressure building coil exemplifying the operating part to be protected.

The container 12 is here shown as comprising a pressure vessel 15 for holding liquid oxygen supported within an outer casing or envelope 16, the intervening space 17 being substantially filled with insulating material, for example magnesium carbonate. The pressure vessel has a filling connection 18 entering the top with which the conduit 11 communicates. Withdrawal connections for the gas material in both the liquid and gas phases are shown at 19 and 19' respectively. From the lower portion of the container a controlled conduit 20 leads to a pressure building coil 21 exposed to the atmosphere in the base of the casing 16. The atmosphere enters the base through vent holes 22, conveniently formed in a depending lower portion or skirt of the casing 16 which extends below the insulating envelope. Coil 21 has a conduit 23 communicating with the upper portion of the pressure vessel. The means which controls the admission of liquid oxygen to the coil 21 comprises a valve 24 that is manipulated from the outside of the casing 16 by means of a hand wheel shown at 25. This arrangement enables pressure to be built at will in the vessel 15 in the manner set forth in U. S. Letters Patent 1,753,785, issued in the name of C. W. P. Heylandt and dated April 8, 1930. The coil 21 here enclosed by the skirt of the container functions as a vaporizer for the liquefied gas admitted thereto, the gas being vaporized by the heat of the atmosphere, that enters this space through the openings provided at 22.

In order that the atmosphere within the skirt of the container 12 may be an anhydrous atmosphere and substantially free from moisture, so that the skirt and the parts housed thereby may be free from deposits of ice and frost and liability to rust, a perforated distributing coil 30 is disposed within the skirt of the container adjacent to the operating part to be protected, such as coil 21. The coil 30 communicates with the conduit 14, which supplies anhydrous waste gas, the admission being controlled in any suitable manner, for example, by means of the valve as shown 31.

Other cold operating parts may be protected against the accumulation of frost and ice by surrounding them with an atmosphere of anhydrous waste product. This is illustrated in connection with oxygen valve 32 which is in conduit 11 and surrounded by a casing 33 that is supplied with anhydrous gas by a conduit 34; this latter being arranged to communicate with conduit 14 and provided with a valve 35 for controlling the admission of anhydrous gas. The casing 33 is normally open to the atmosphere through the clearance space provided at the place where the extended operating stem of valve 32 passes through the casing.

In operation, the system of the present invention is operated to supply liquid oxygen through the conduit 11 to the container 12 in any desired amount. In order that gas material may be withdrawn when desired through the connections 19 and 19', it is desired that the contents of the container shall be under a pressure above atmospheric. For this purpose, liquid oxygen is admitted to the vaporizing coil 21 in amounts sufficient to be vaporized and generate the pressure desired. During periods of vaporization and preferably at all other times, it is desired that the space enclosed by the skirt of the container 12 shall be free from moisture, so as to avoid the formation of ice and frost on the coil 21. Accordingly, the valve 31 is opened to supply a desired amount of waste anhydrous gas to the space enclosed by the skirt. This surrounds the coil 21 with an anhydrous atmosphere. This gas is supplied through the perforations in the coil 30 and surrounds the coil 21 with an anhydrous atmosphere incapable of depositing any moisture on the coil or other parts enclosed by the skirt. The working order of the parts is thus preserved and liability for the parts within the skirt or otherwise contacted by the outer atmosphere to rust, is avoided.

It is also seen that by the present invention, improved conditions for the transfer of heat from the atmosphere to the pressure building coil 21 are achieved since by the escape of anhydrous gas into space about the coil, a dry atmosphere results which brings about substantially an optimum condition for heat transfer as no moisture can be deposited on the coil. The heat transfer coefficient between the gas surrounding the coil and the coil surface, under these conditions, will be relatively large and the rate of pressure building will have a corresponding high value.

In similar manner, the anhydrous gas admitted to the casing 33 protects the operating parts therein against the deposition of ice and frost. Thus, it is seen that the waste products of the production apparatus are, by the present invention, employed to keep cold operating parts of the apparatus at all times in an operating condition and free from an environment that affects their life deleteriously.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In a system for producing and storing liquid oxygen, the combination with liquid oxygen production apparatus having a vent for waste anhydrous gas, of auxiliary apparatus having an operating part exposed to the normal atmosphere, and means for conveying anhydrous gas from said vent to said auxiliary apparatus arranged to provide an anhydrous atmosphere about said part.

2. In a system for producing and storing liquid oxygen, the combination with liquid oxygen production apparatus having a vent for waste anhydrous gas, of auxiliary apparatus having an operating part exposed to the normal atmosphere, a casing vented to the normal atmosphere disposed about said operating part, and means for discharging anhydrous gas drawn from said vent into said casing at a rate providing an anhydrous atmosphere about said part.

3. In a system for producing and storing liquid oxygen, the combination with liquid oxygen production apparatus having a vent for waste anhydrous gas, of auxiliary apparatus having an operating part exposed to the normal atmosphere, a vented casing disposed about said operating part, and a conduit leading from the vent of said production apparatus and arranged to discharge into said vented casing.

4. In a system for producing and storing liquid oxygen, the combination with liquid oxygen production apparatus having a vent for waste anhydrous gas, of auxiliary apparatus having an operating part exposed to the normal atmosphere, a vented casing disposed about said operating part, a conduit leading from the vent of said production apparatus and discharging into said casing, and means in said conduit for controlling the rate of discharge into said casing.

5. In a system for producing and storing liquid oxygen, the combination with liquid oxygen production apparatus having a discharge conduit for waste anhydrous gas, of an insulated container for holding liquid oxygen having a casing and an operating part therein exposed to the normal atmosphere, and a conduit leading from said discharge conduit arranged to discharge in said casing adjacent said operating part.

6. In a system for producing and storing liquid oxygen, the combination with liquid oxygen production apparatus having a discharge conduit for waste anhydrous gas, of an insulated container for holding liquid oxygen having a casing and a vaporizing coil in said casing exposed to the normal atmosphere, a second conduit leading from said discharge conduit to a point within said casing, a distributor connected to said second conduit and arranged to discharge anhydrous gas adjacent said vaporizing coil, and means in said second conduit for controlling the rate of discharge from said distributor.

FRANK P. KINSON.